United States Patent
Praxmarer et al.

(10) Patent No.: US 11,479,446 B2
(45) Date of Patent: Oct. 25, 2022

(54) CONVEYING CHAIN FOR A PANEL BELT OF A MOVING WALKWAY OF SMALL OVERALL HEIGHT

(71) Applicant: INVENTIO AG, Hergiswil (CH)

(72) Inventors: Dominik Praxmarer, Vienna (AT); Gerhard Kleewein, Pressbau (AT); Kurt Streibig, Rekawinkel (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/286,781

(22) PCT Filed: Oct. 23, 2019

(86) PCT No.: PCT/EP2019/078815
§ 371 (c)(1),
(2) Date: Apr. 19, 2021

(87) PCT Pub. No.: WO2020/088998
PCT Pub. Date: May 7, 2020

(65) Prior Publication Data
US 2021/0339986 A1    Nov. 4, 2021

(30) Foreign Application Priority Data
Oct. 30, 2018  (EP) ..................................... 18203435

(51) Int. Cl.
*B66B 23/10* (2006.01)
*B65G 17/40* (2006.01)
(Continued)

(52) U.S. Cl.
CPC .............. *B66B 23/10* (2013.01); *B65G 17/40* (2013.01); *B65G 17/42* (2013.01); *B66B 21/10* (2013.01)

(58) Field of Classification Search
CPC ....... B66B 23/02; B66B 23/024; B66B 23/10; B65G 17/42; B65G 17/40
(Continued)

(56) References Cited

U.S. PATENT DOCUMENTS 1,556,343 A * 10/1925 Philips ................... B65G 17/42
                                                                198/701
4,232,783 A * 11/1980 Kraft ..................... B66B 23/024
                                                                198/851

(Continued)

FOREIGN PATENT DOCUMENTS

DE        2713449 B1    8/1978
EP        0795512 B1    7/2000
(Continued)

OTHER PUBLICATIONS

International Search Report for International Application No. PCT/EP2019/078815 dated Jan. 9, 2020.

*Primary Examiner* — James R Bidwell
(74) *Attorney, Agent, or Firm* — Knobbe Martens Olson & Bear LLP

(57) ABSTRACT

A conveyor chain for a pallet belt of a moving walkway is described. The conveyor chain comprises multiple elongate chain links, which are arranged behind one another at a chain pitch, and which can be subjected to a tensile load by link pins and are coupled so as to be pivotable about a longitudinal center axis of the respective link pin transverse to the longitudinal direction. The conveyor chain furthermore comprises multiple elongate connecting elements that are likewise arranged behind one another and pivotably coupled to one another. Each of the connecting elements is coupled to an associated first link pin with a front end and coupled to an associated second link pin with a rear end. In this case, a connecting element pitch between the first and (Continued)

the second link pin amounts to an integer multiple of the chain pitch.

16 Claims, 5 Drawing Sheets

(51) Int. Cl.
*B65G 17/42* (2006.01)
*B66B 21/10* (2006.01)

(58) Field of Classification Search
USPC .............. 198/321, 326, 850, 851, 852, 853
See application file for complete search history.

(56) References Cited

U.S. PATENT DOCUMENTS

| | | | | |
|---|---|---|---|---|
| 5,072,821 A | * | 12/1991 | Kruse | ............... F16C 33/04 |
| | | | | 198/327 |
| 8,931,614 B2 | * | 1/2015 | Senger | ............... B66B 23/10 |
| | | | | 198/327 |
| 9,718,647 B2 | * | 8/2017 | Makovec | ............ B66B 21/10 |
| 10,683,192 B2 | * | 6/2020 | Michalke | ............ B66B 21/10 |
| 10,793,398 B2 | * | 10/2020 | Turek | ............... B66B 29/02 |
| 2017/0297873 A1 | | 10/2017 | Turek | |

FOREIGN PATENT DOCUMENTS

| | | | | |
|---|---|---|---|---|
| EP | 0934171 B1 | | 9/2001 | |
| EP | 1502891 | * | 7/2004 | ............ B66B 23/02 |
| JP | H09104584 A | | 4/1997 | |
| WO | WO 2013152714 A1 | | 10/2013 | |

\* cited by examiner

CONVEYING CHAIN FOR A PANEL BELT OF A MOVING WALKWAY OF SMALL OVERALL HEIGHT

TECHNICAL FIELD

The present disclosure pertains to a conveyor chain for a pallet belt of a moving walkway, as well as to a pallet belt and a moving walkway equipped with such a conveyor chain.

SUMMARY

Moving walkways are used as passenger transport systems in order to transport passengers within a building along a typically horizontal or slightly inclined travel path. For this purpose, a moving walkway comprises a pallet belt, on which passengers can stand and which can be moved along the travel path in a revolving manner. A plurality of pallets are arranged behind one another in the pallet belt. Each of the pallets is typically accommodated between two conveyor chains that are arranged along opposite sides of the pallet belt. Each of the conveyor chains is in turn composed of a plurality of elongate chain links, which are arranged behind one another at a pitch and pivotably connected to one another by means of link pins such that the entire conveyor chain can be subjected to high tensile loads. In this case, the pitch essentially corresponds to the distance between the longitudinal center axes of the link pins.

The pallet belt is arranged in a revolving manner. This means that the pallets can be moved along the travel path in a forward direction with the aid of the conveyor chains. At the end of the travel path, the pallet belt is respectively deflected by means of deflection devices such that the pallets can be moved back to the beginning of the travel path in the opposite return direction in the annularly closed pallet belt. Corresponding deflection devices typically comprise deflection chain wheels, which respectively interact with one of the conveyor chains in order to generally deflect the respective conveyor chain from the forward direction into the return direction or vice versa by 180°.

If a moving walkway should be installed in a building to be newly constructed, it is possible to integrate at least parts of the moving walkway into a floor of the building such that a bearing surface formed by the pallets in the forward direction can end as flush as possible with a surface of the floor. For this purpose, it may be advantageous to use moving walkways with a low structural height such that no deep pits, in which the moving walkway can be accommodated, have to be provided in the floors of the building.

If an already existing building should be retrofitted with a moving walkway, it may in some instances be impossible or at least very difficult to at least partially sink this moving walkway into a floor of the building, for example, for reasons of statics. The moving walkway has to be constructed on the floor of the building in this case. In this context, a height difference between a level, on which the bearing surface of the moving walkway extends, and a level of the surrounding floor should be as small as possible. It is therefore particularly advantageous to use a moving walkway with a very low structural height for these applications.

The structural height of a moving walkway is largely defined by the structural height of its deflection devices and particularly by a diameter of the deflection chain wheels used therein, wherein said deflection chain wheels are typically arranged vertically. When using deflection chain wheels with a very small diameter, so-called polygon effects can occur due to the fact that it is not possible to use arbitrarily small pallets, but the pallets rather must have a minimum length (measured in the direction of the travel path) for practical use. Such polygon effects can noticeably occur if the length of the pallets and therefore also a pitch of the conveyor chain are not sufficiently small in comparison with the diameter of the deflection chain wheels. In order to prevent such polygon effects, the deflection chain wheels of conventional moving walkways were realized with no less than 17 teeth and therefore typically had a minimum structural height.

WO 2013/152714 A1 describes a pallet belt for use in a conveyor system, particularly a moving walkway. The described pallet belt comprises two conveyor chains and pallets arranged between these conveyor chains. Due to its structural design, this pallet belt can also assist in limiting polygon effects to a certain degree when small deflection chain wheels are used. However, the structural design of the described pallet belt is relatively fragile and comprises safety-relevant components, which are subjected to high loads and can lead to dangerous situations for the users if they are improperly installed or fail.

Consequently, there may be a demand for a conveyor chain for a pallet belt, as well as for a pallet belt and a moving walkway equipped with such a conveyor chain, in which, among other things, a few of the above-described problems or limitations are advantageously eliminated. There may be a particular demand for a conveyor chain and a pallet belt equipped with such a conveyor chain, which ensure a high degree of reliability during the operation and can be used in a moving walkway of low structural height without thereby provoking excessive polygon effects, as well as easily installed, removed and serviced.

Such a demand can be met according to the principles described herein. Advantageous embodiments are defined throughout the following description.

According to a first aspect of the disclosure, a conveyor chain for a pallet belt of a moving walkway is proposed. The conveyor chain comprises at least multiple elongate chain links that are arranged behind one another at a chain pitch in a longitudinal direction of the conveyor chain. In this case, chain links lying adjacent to one another in the longitudinal direction can be respectively subjected to a tensile load in a joint region by means of a link pin and are coupled to one another so as to be pivotable about an axis of the link pin transverse to the longitudinal direction.

The conveyor chain furthermore comprises multiple elongate connecting elements that are arranged behind one another in parallel in the longitudinal direction. Two longitudinally adjacent connecting elements respectively can be coupled to one another by means of a link pin, which couples two longitudinally adjacent chain links to one another. The connecting elements, which are coupled to one another by means of the link pin, are mounted so as to be pivotable about the axis of the link pin transverse to the longitudinal direction. Each of the connecting elements is on a front end coupled to an associated first link pin and on a rear end coupled to an associated second link pin, wherein a connecting element pitch between the first and the second link pin is an integer multiple of the chain pitch. Each of the connecting elements furthermore has a fastening region for connecting a pallet.

In the present document, the terms coupling, couple and coupled refer to a connection that allows relative motions between the coupled parts, but does not allow a separation of the coupled parts without additional effort. This additional effort for disengaging the coupling of these parts may involve, for example, loosening a screw, a nut or a splint, actuating a snap-type mechanism or even irreversibly destroying a coupling component and the like.

Due to this design, the connecting elements form a chain that extends parallel to the chain links and decisively enhances the reliability of the conveyor chain. If one of the chain links breaks, for example, the connecting elements arranged parallel thereto can hold together the conveyor chain. This parallel chain formed by the connecting elements is not subjected to a tensile load in the longitudinal direction during the normal operation because all tensile forces are respectively absorbed or transmitted by the chain links. The connecting element can only absorb the tensile forces in the event of damage to a chain link or a link pin in the region of the chain link by bridging the damaged area. An exchange of damaged pallets can be carried out within a very short time because the connecting elements do not simply form an integral component of the pallets, but rather have a fastening region for connecting a pallet. Furthermore, this design also allows a significantly simplified exchange of wearing parts such as the bearing bushes of the conveyor chain because unproblematic access to these parts is ensured due to the ability to remove individual pallets from the pallet belt.

In an embodiment of the first aspect, the front end of the connecting element may be coupled to the associated first link pin so as to be pivotable and coaxially positioned and the rear end of the connecting element may be coupled to the associated second link pin so as to be pivotable and linearly guided in the longitudinal direction. In a potential variation of this embodiment, the rear end of the connecting element can be linearly guided so as to be displaceable over a predefined distance.

According to a second aspect of the disclosure, a pallet belt for a moving walkway is proposed, wherein said pallet belt comprises two conveyor chains and multiple pallets. The first and the second conveyor chain are realized in accordance with embodiments of the first aspect of the disclosure. The two conveyor chains are arranged parallel to one another in this case. The pallets are arranged behind one another along a longitudinal direction of the conveyor chains. Each pallet is fastened on one of the connecting elements of the first conveyor chain with a first lateral end and fastened on one of the connecting elements of the second conveyor chain with an opposite second lateral end.

According to a third aspect of the disclosure, a moving walkway is proposed, wherein said moving walkway comprises a pallet belt and two deflection devices. The pallet belt is realized in accordance with an embodiment of the second aspect of the disclosure. The two deflection devices are respectively provided with deflection chain wheels for deflecting the pallet belt in deflecting regions on opposite ends of the moving walkway.

Briefly summarized, potential characteristics and advantages of embodiments of the disclosure can, among other things, be considered to be based on ideas and realizations described below without thereby restricting the disclosure.

In conventional pallet belts for moving walkways, pallets are in most instances directly connected to the chain links or to possibly extended link pins of the conveyor chains. In this context, conveyor chains with a relatively large pitch were used in most instances such that the length of the pallets essentially corresponded to the pitch of the conveyor chains.

If a short pitch should be realized by using short chain links in the conveyor chains, for example, as described in the approach according to WO 2013/152714 A1, the pallets still are directly connected to the link pins of the conveyor chains. However, an individual pallet spans the length of multiple chain links such that one or more link pins, which are not connected to the pallet, remain between a coupling of the pallet to a front link pin and a coupling of the pallet to a rear link pin.

Since such a configuration leads to a length difference between the region of the conveyor chain extending along the circumference of the deflection chain wheel on the one hand and the pallet linearly extending in between on the other hand during the deflection of the conveyor chain on a deflection chain wheel, this length difference as to be compensated with the aid of a suitable mechanism. This mechanism is conventionally provided in the region of the connection of the pallets to one or more of the link pins, by means of which the pallets should be coupled. The design of such a mechanism may be complex and/or sensitive. In this type of connection of the pallets to the conveyor chains, it may furthermore be complicated, for example, to install the pallet belt and/or to remove the pallet belt during the course of servicing and/or to replace defective parts of the pallet belt. In addition, the pallets cannot be directly coupled to one another for reasons of functionality and installation technology such that they do not form a chain extending parallel to the conveyor chains.

Embodiments of the conveyor chain proposed herein and of the pallet belt equipped with such a conveyor chain make it possible to achieve a high operational reliability, a simplified structural design of the pallet belt and/or a relatively simple installation of the pallet belt and a relatively simple removal of individual pallets, respectively.

For this purpose, the pallets are not directly connected to the chain links or link pins of the conveyor chain. Instead, special connecting elements are provided, on which the pallets can be fastened. In this case, the connecting elements form an additional chain that extends parallel to the respective conveyor chain, wherein the connecting elements have a length that is several times greater than the length of the chain links of the conveyor chain. In other words, the additional chain formed by the connecting elements has a greater pitch than the chain formed by the chain links, wherein the former pitch is also referred to as connecting element pitch and the latter pitch is also referred to as chain pitch in the following description. The connecting elements are coupled to link pins of the conveyor chains in this case. Since the connecting elements are longer than the chain links of the conveyor chains, the opposite ends of the connecting elements are respectively coupled to every second, every third or generally every n-th (n>2) link pin, for example, at least one link pin, which is not coupled to the connecting element, is located between two link pins that are coupled to a connecting element. The connecting element pitch therefore is an integer multiple of the chain pitch.

The connecting elements have a suitable structural design for compensating the length differences occurring between the shorter chain links of the conveyor chains and the comparatively longer connecting elements during a deflection of the conveyor chains. In this way, the conveyor chain can also be deflected around deflection chain wheels that have a small diameter without the risk of polygon effects leading to undesirable consequences.

Since the pallets are not directly connected to the link pins, but rather indirectly connected to the link pins by means of the connecting elements, it is furthermore possible, among other things, to install, remove or exchange the pallets and/or other components of the pallet belt in a simplified manner.

BRIEF DESCRIPTION OF THE DRAWINGS

Embodiments of the disclosure are described below with reference to the attached drawings, wherein neither the drawings nor the description should be interpreted in a restrictive sense. It should be noted that a few of the potential characteristics and advantages of the disclosure are described herein with reference to different embodiments of the conveyor chain, the pallet belt or the moving walkway on the one hand and with reference to different variations of a method for assembling a conveyor chain, a method for exchanging a connecting element in a conveyor chain or a method for assembling a pallet belt for a moving walkway on the other hand. A person skilled in the art understands that the characteristics can be suitably combined, transferred, adapted or exchanged in order to arrive at other embodiments of the disclosure.

The figures are merely schematic and not true-to-scale. Identical or identically acting characteristics are identified by the same reference symbols in the different figures.

DETAILED DESCRIPTION

Figure 1:
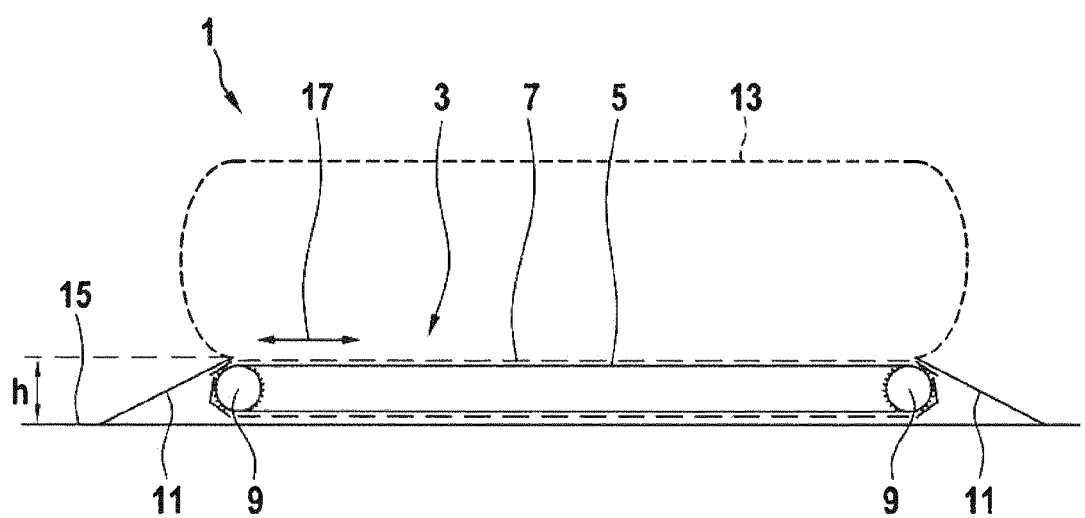
FIG. 1 shows a highly schematic longitudinal section through a moving walkway.

FIG. 1 shows a highly schematic representation of a moving walkway 1, by means of which passengers can be transported along a horizontal travel path. The moving walkway 1 comprises a pallet belt 3, the upwardly directed walk-on portion of which extends along the travel path in a longitudinal direction 17. This walk-on portion of the pallet belt 3 is moved in a forward direction during the operation of the moving walkway 1. The pallet belt 3 respectively is annularly closed or arranged in a revolving manner and deflected on opposite ends of the moving walkway 1 with the aid of deflection chain wheels 9 such that a downwardly directed portion of the pallet belt is moved back in a return direction. Inclined ramps 11 are respectively provided in an entry region, as well as in an exit region, in order to easily walk on and off the pallet belt 3 without steps. Furthermore, a handrail 13 is arranged along the travel path, but merely indicated with a broken line in order to provide a better overview.

The pallet belt 3 comprises two conveyor chains 5, as well as multiple pallets 7 held on these conveyor chains 5. In this case, the conveyor chains 5 are arranged parallel to one another and on opposite sides of the moving walkway 1 referred to a lateral direction of the moving walkway 1 (perpendicular to the plane of projection). Each conveyor chain 5 is composed of a plurality of chain links that are pivotably coupled to one another with the aid of link pins. The pallets 7 are mechanically connected to the two conveyor chains 5 such that the pallets 7 are also moved along the travel path during the motion of the conveyor chains 5.

The moving walkway 1 is constructed on a floor 15 in the example shown. In this case, the structural height h should be as low as possible, for example, in order to respectively limit a length or incline of the ramps 11. Due to the desired low structural height h, the diameter of the deflection chain wheels 9 should also be as small as possible.

In conventional moving walkways, a length of the chain links forming the conveyor chain measured along the longitudinal direction essentially corresponds to a length of the pallets. In other words, a pitch of the conventional conveyor chain essentially corresponds to a pitch of the conventional pallet belt formed thereby. In this way, a pallet is on its front and its rear ends respectively connected to one of the link pins on the opposite ends of the chain link extending parallel to the pallet 7.

During the deflection of the relatively long chain links including the pallets 7 connected thereto, however, noticeable polygon effects can occur if the respective pitch of the conveyor chain 5 or the pallet belt 3 is not significantly smaller than a diameter of the deflection chain wheels 9. It was determined, in particular, that noticeable polygon effects occur on deflection chain wheels 9 that are realized in the form of toothed wheels, each tooth of which should engage into a recess formed in a chain link, if the deflection chain wheel 9 comprises fewer than 17 teeth.

The present disclosure pertains to a moving walkway 1 and its components, particularly the pallet belt 3 and the conveyor chain 5, as well as to a method for assembling or repairing such components, wherein the moving walkway 1 can due to its structural and functional properties be realized with a low structural height h without producing unacceptably strong polygon effects during the deflection of the pallet belt 3. Due to its specific structural peculiarities, the present disclosure furthermore enhances the operational reliability of the moving walkway 1. In addition, the conveyor chain 5 and the pallet belt 3 formed thereby can be easily assembled and their respective components can be easily exchanged as needed.

Potential details and advantages of embodiments of the present disclosure are described below with reference to the figures. In this context, the initial portion of the following description primarily concerns structural and functional properties of the conveyor chain 5, the pallet belt 3 formed thereby or the moving walkway 1 ultimately produced therewith. Potential variations of a method for assembling such a conveyor chain 5 or such a pallet belt 3, as well as a method for exchanging connecting elements in such a conveyor chain 5, are subsequently described.

It should be noted that characteristics described with respect to devices such as the conveyor chain 5, the pallet belt 3 or the moving walkway 1 may have corresponding effects on the respective methods for their assembly or repair and that characteristics of the methods described herein may in turn correlate with properties of the correspondingly designed devices.

Figure 2:
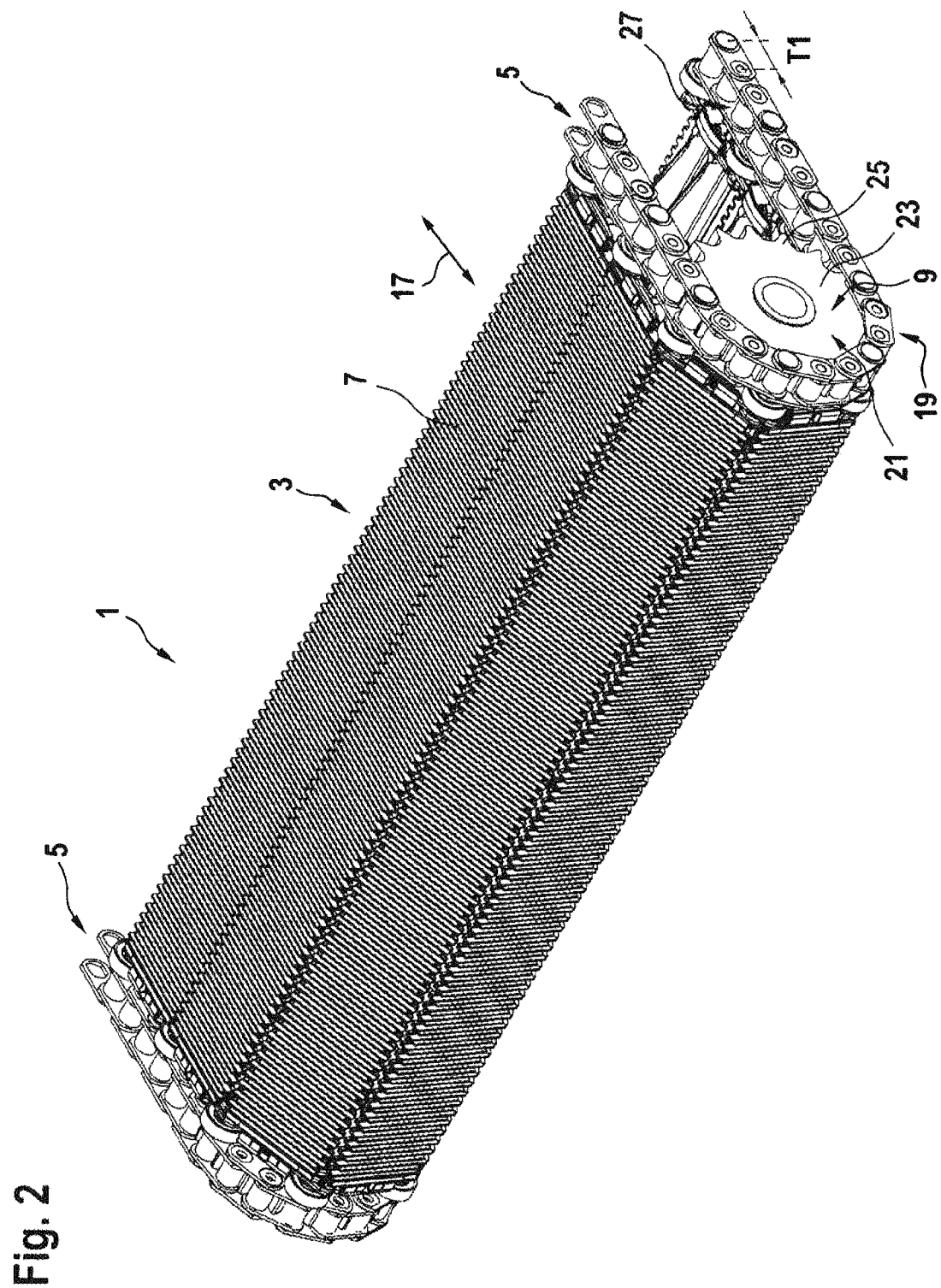
FIG. 2 shows a perspective view of part of a pallet belt for a moving walkway with a conveyor chain according to an embodiment of the present disclosure.
Figure 3:
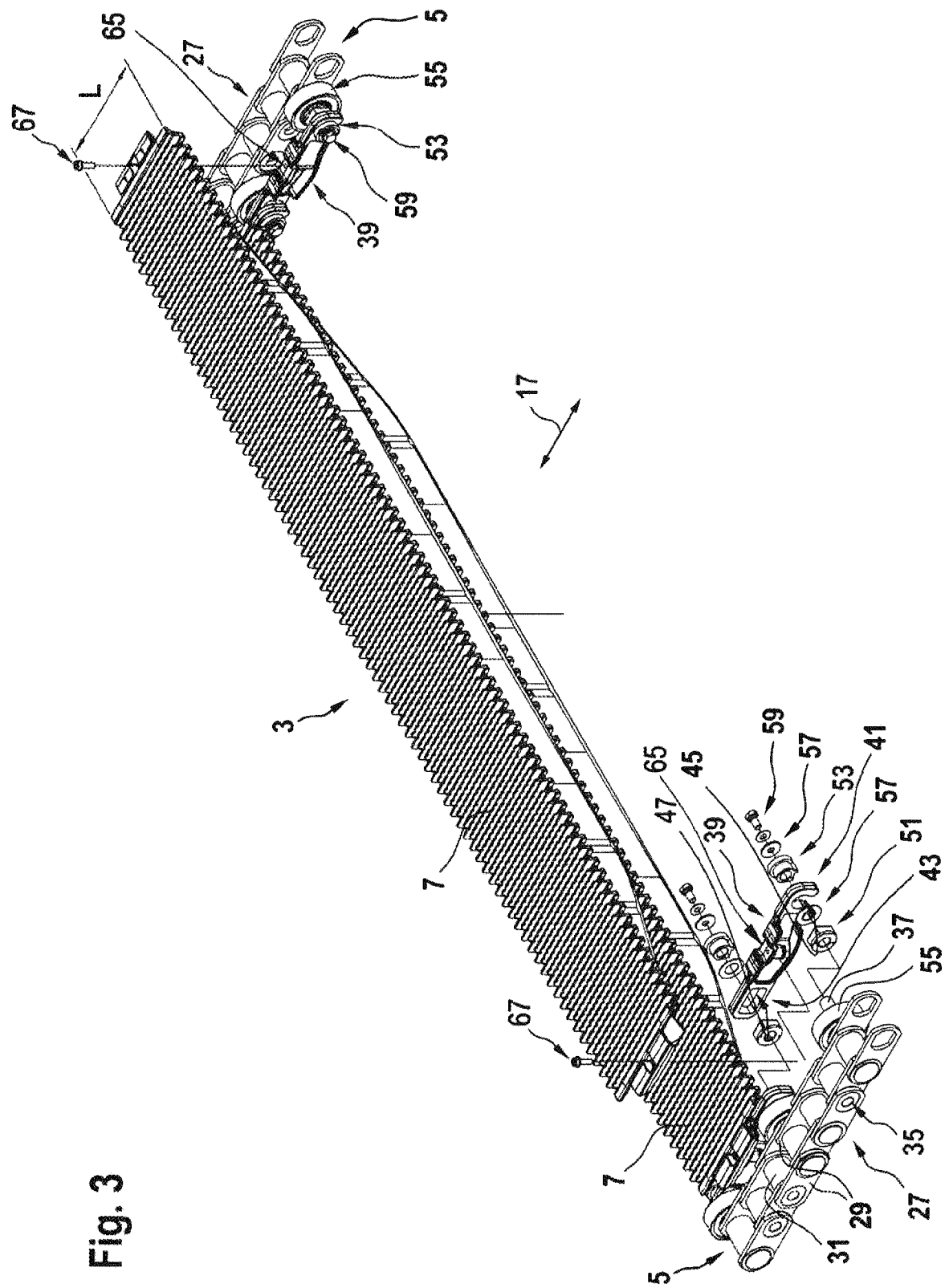
FIG. 3 shows another perspective view of part of the conveyor belt illustrated in FIG. 1 in the form of a partially exploded view.
Figure 4A:
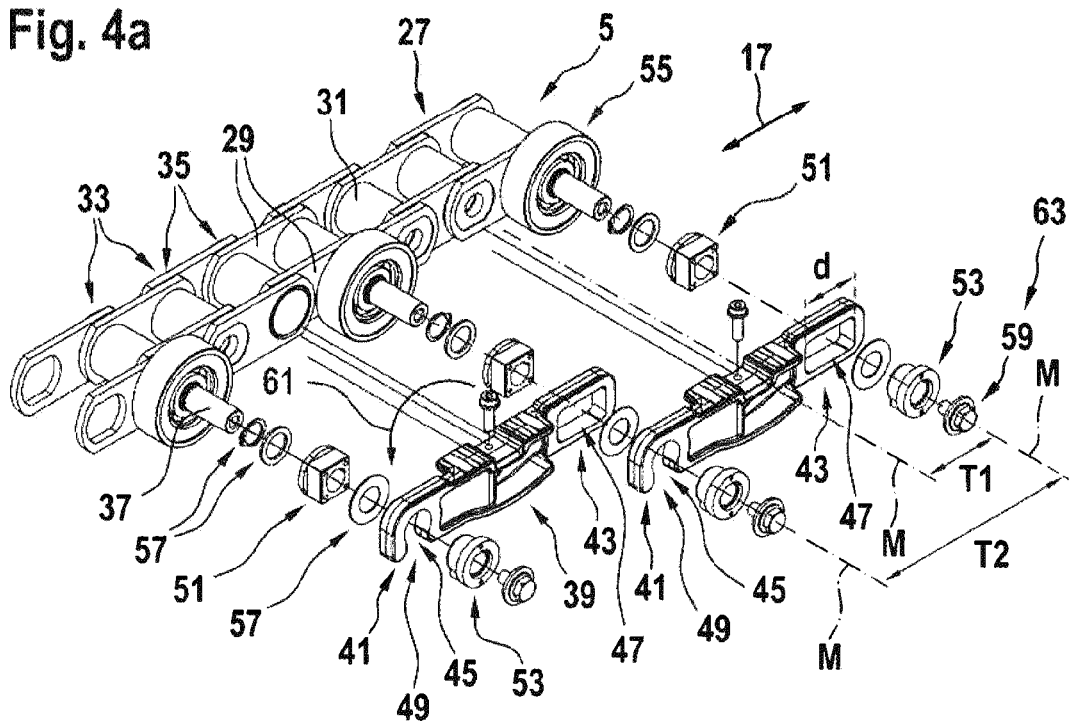
FIGS. 4a-c respectively show a partial section of a conveyor chain according to an embodiment of the present disclosure in the form of a perspective exploded view, in the form of a perspective front view and in the form of a perspective rear view.
Figure 4B:
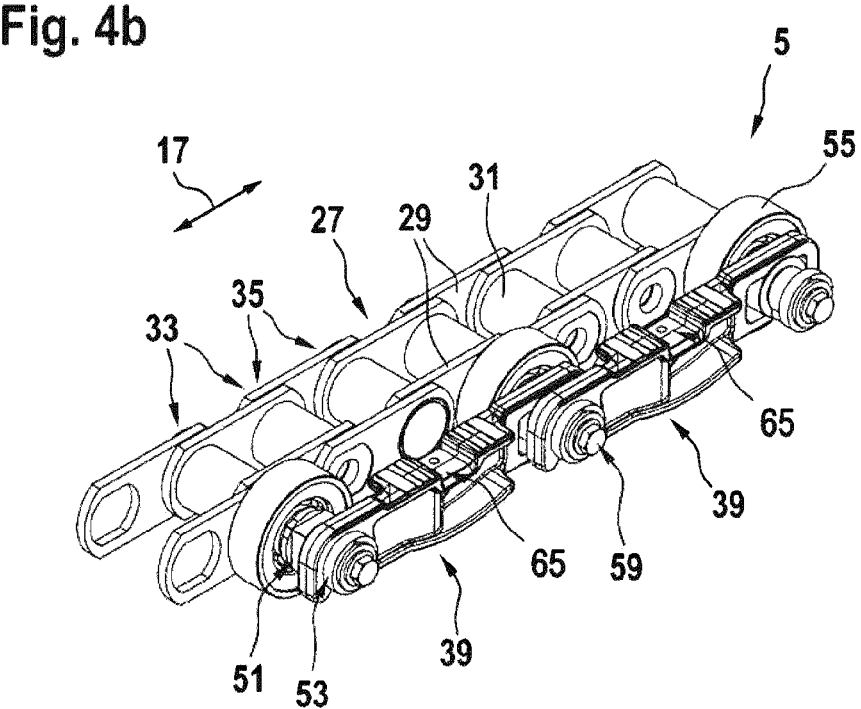
Figure 4C:
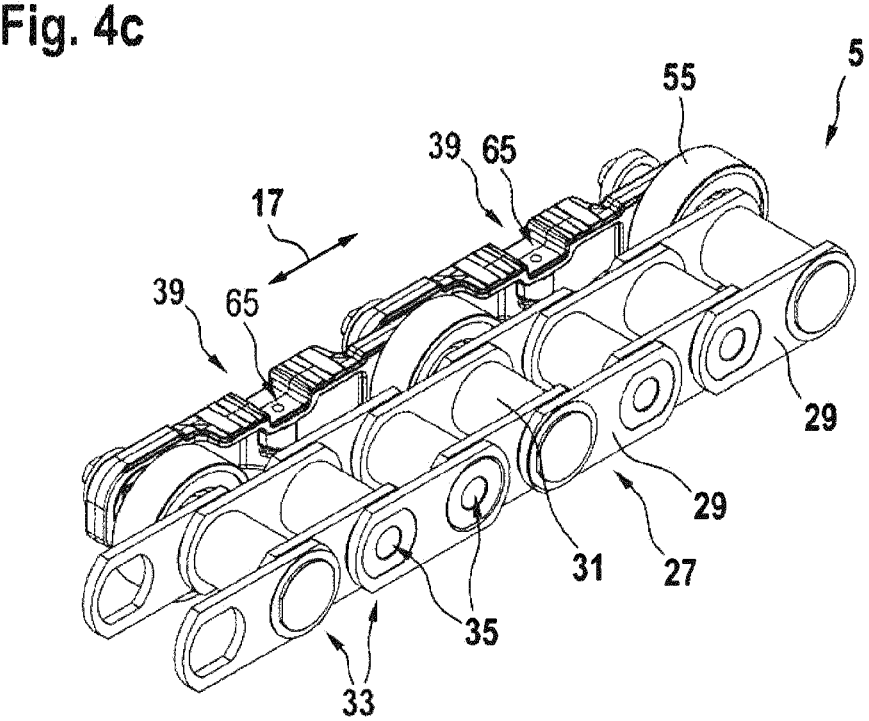

FIG. 2 shows a perspective view of part of a moving walkway 1 in a deflecting region 19. The pallet belt 3 is deflected from a forward direction into a return direction or vice versa by means of a deflection device 21 in this deflecting region 19. For this purpose, the deflection device 21 comprises deflection chain wheels 9 in the form of toothed wheels 23, which are arranged on opposite sides of the pallet belt 3 and interact with conveyor chains 5 extending at these locations. The deflection chain wheels 9 have a small diameter, for example, of less than 40 cm, preferably less than 30 cm, particularly less than 25 cm, such that the entire moving walkway 1 can have a low structural height h that, for example, amounts to significantly less than 50 cm, preferably even less than 35 cm.

However, since the conveyor chains 5 have a short chain pitch T1, the teeth 25 formed on the toothed wheel 23, which engage into individual chain links 27 of the conveyor chain 5, can be arranged closely adjacent to one another. Accordingly, at least 17 teeth 25 can also be provided on the outer circumference of a small deflection chain wheel 9 such that polygon effects during the revolution of the conveyor chains 5 can remain negligible.

FIGS. 3 and 4a to 4c show details of the pallet belt 3, as well as the conveyor chain 5 used therein, in the form of perspective and partially exploded views. These figures are collectively described below.

The conveyor chain 5 comprises multiple elongate chain links 27. The chain links 27 are arranged behind one another along the longitudinal direction 17 of the conveyor chain 5. In the example shown, each chain link 27 is realized with two sheet-like link plates 29 that are arranged parallel to one another. The link plates 29 are spaced apart from one another by means of sleeves 31. Chain links 27 lying adjacent to one another in the longitudinal direction 17 are respectively connected to one another by means of a link pin 35 in a joint region 33. In this way, the conveyor chain 5 can be subjected to high tensile loads and pivoted about respective longitudinal center axes M of the link pins 35 transverse to the longitudinal direction 17.

A distance between the longitudinal center axes M of two adjacent link pins 35 of the conveyor chain 5 corresponds to the chain pitch T1. In order to achieve the desired negligible polygon effects during the deflection of the conveyor chain 5, the individual chain links 27 of the conveyor chain 5 absorbed short that the chain pitch T1 preferably amounts to less than 10 cm, particularly less than 6 mm, especially 50 mm±2 mm.

In conventional pallet belts 3, the pallets 7 are in most instances directly connected to the link pins 35 of the conveyor chains 5. For example, lateral faces of the pallets 7 are directly connected to extended link pins 35 that laterally protrude over the conveyor chains 5.

In contrast, the pallet belt 3 proposed herein is provided with additional elongate connecting elements 39 on the conveyor chain 5. The connecting elements 39 are arranged behind one another in or parallel to the longitudinal direction 17 similar to the chain links 27. In this case, two connecting elements 39 lying adjacent to one another in the longitudinal direction 17 are coupled to one another so as to be pivotable transverse to the longitudinal direction 17. Such a coupling may be realized, for example, by means of extended link pins 37 of the conveyor chain 5, which laterally protrude over the chain links 27 and to which the connecting elements 39 can be connected. The connecting elements 39 furthermore have fastening regions 65 for connecting a pallet 7. An exchange of damaged pallets 7 can be carried out within a very short time because the connecting elements 39 do not simply form an integral component of the pallets 7, but rather have a fastening region 65 for connecting a pallet 7. Furthermore, this design also allows a significantly simplified exchange of wearing parts such as sliding components 51 and bushes (or bushings) 53 of the conveyor chain 5 because unproblematic access to these parts is ensured due to the ability to remove individual pallets 7 from the pallet belt 3.

A distance between the longitudinal center axes M of the first and the second extended link pin 37 in the longitudinal direction 17 is referred to as connecting element pitch T2 herein. In the conveyor chain 5 described herein, this connecting element pitch T2 should be an integer multiple of the chain pitch T1, for example, T2=n*T1, with n=2, 3, 4, . . . In the example shown, the connecting element pitch T2 amounts to three-times the chain pitch, for example, T2=3*T1. In other words, the connecting elements 39 should be longer than the chain links 27 by about an integer multiple, for example, twice or thrice as long.

As a result, each of the connecting elements 39 is not connected to directly adjacent link pins 35, 37 on its opposite ends 41, 43. Instead, at least one link pin 35, 37, which is not coupled to the connecting element 39, is located between two link pins 35, 37, to which one of the respective ends 41, 43 of the connecting element 9 is connected. In other words, each of the connecting elements 39 is only coupled to every second, every third or generally every n-th link pin 35, 37.

In the example shown, the ends 41, 43 of the connecting elements 39 are coupled to every third link pin 35, 37, wherein these link pins 35, 37 are realized in the form of extended link pins 37 in this case. Two shorter link pins 35, which merely connect the chain links 27 of the conveyor chain 5 to one another, but are not connected to the connecting element 39 extending parallel thereto, are respectively located between two thusly extended link pins 37.

In the described pallet belt 3, the pallets 7 are not directly connected to the conveyor chain 5. Instead, the respective pallets are attached to the connecting elements 39 in the fastening regions 65 with the aid of fastening means 67 such that the pallets are indirectly connected to the conveyor chain 5 via these connecting elements 39.

In this case, a length L of the pallets 7 measured in the longitudinal direction 17 may approximately correspond to the connecting element pitch T2 and therefore be several times longer than the length of the chain links 27 and their chain pitch T1. In this context, the pallets 7 generally are slightly shorter than the connecting element pitch T2 such that a small gap remains between adjacent pallets 7 in order to enable the pallets 7 to shift relative to one another. In a concrete example, a pallet length of almost 150 mm can be used for a conveyor chain 5 with a chain pitch T1 of 50 mm such that each of the pallets 7 spans or "overlaps" multiple chain links 27.

During the deflection of such a pallet belt 3 in a deflecting region 19, the conveyor chain 5 with its chain links 27 effectively travels along the outer circumference of one of the deflection chain wheels 9 over a radian measure of a pitch circle. The long pallets 7 in contrast extend along chords between the chain links 27 overlapped by the pallets. In other words, the pallets 7 do not extend along the traverse defined by the link pins 35, 37 during the deflection, but rather along straight lines that connect the respective link pins 35, 37, to which the connecting elements 39 are connected. The length of these chords is shorter than the length of the circumference or the aforementioned traverse, respectively. This can be referred to as chord contraction.

A special design of the connecting elements 39 or the way, in which these connecting elements are connected to the conveyor chain 5, is required for compensating chord contractions, which occur due to the fact that the connecting element 39 are longer than the chain links 27. At least one of the ends 41, 43 of each connecting element 39 particularly should be coupled to the conveyor chain 5 in such a way that a length compensation for compensating the chord contraction can be realized.

For a better understanding of this description, the extended link pins 37 described in connection with a specific connecting element 39 are referred to as associated link pins 37 below. Furthermore, the extended link pins 37, which interact with a certain region of the connecting element, are respectively referred to as first of the link pins 37 and second of the link pins 37 or as first link pin 37 and second link pin 38 in order to describe their arrangement relative to the associated connecting element 39. For the same reason, the ends of the connecting element 39 are referred to as front end 41 and a rear end 43, wherein these references are not intended to define a moving direction of the connecting element 39 in the longitudinal direction.

For example, the front end 41 of a connecting element 39 may be coupled to the first link pin 37 so as to be pivotable and coaxially positioned in order to compensate the chord contraction.

In other words, the front end 41 of the connecting element 39 may be coupled to the first link pin 37 in such a way that the connecting element 39 is pivotable about the longitudinal center axis M of the link pin 37, but fixed relative to the link pin 37 in the directions extending transverse to the longitudinal center axis of the link pin 37. Consequently, the front end 41 of the connecting element 39 is in fact connected to the conveyor chain 5 so as to be pivotable about the axis of the link pin 37, but cannot be linearly displaced relative thereto. In other words, the connecting element 39 may on its front end 41 be connected to the first link pin 37 in such a form-fitting manner that only pivoting motions about the longitudinal center axis M of the link pin 37 are possible, but no translatory motions relative to the link pin 37 in the longitudinal direction 17.

In contrast, the rear end of each connecting element 9 may be coupled to the second link pin 37 so as to be pivotable, as well as displaceable over a predefined distance d in the longitudinal direction 17 in a linearly guided manner.

In other words, the rear end 43 of the connecting element 39 may be coupled to the second link pin 37 in such a way that the connecting element 39 is pivotable about the longitudinal center axis M of the second link pin 37 and furthermore displaceable relative to the link pin 37 over the predefined distance d in a direction extending transverse to this longitudinal center axis M, particularly such that its linear motion is guided due to the design of the coupling between the connecting element 39 and the second link pin 37. In other words, the connection between the rear end 43 of the connecting element 39 and the second link pin 37 may be realized in such a way that this rear end 43 can move relative to the second link pin 37 in a translatory manner in the direction extending transverse to the longitudinal center axis M of the link pin 37.

A linear motion over the distance d should be permissible in this case. This distance d may correspond to or be greater than the length of the aforementioned chord contraction. In other words, the distance d may correspond to the length, by which the chord between the first and the second link pin 37 differs from the circumference along a segment of a circle when the conveyor chain 5 is deflected about the segment of a circle. For example, the distance d may correspond to at least 150% or preferably at least 200% of the diameter of the second link pin 37.

A parallel chain is effectively formed with the connecting elements 39 described herein and their connection to the conveyor chain 5, wherein the pitch of this parallel chain is significantly greater than that of the chain links 27 and essentially corresponds to the length of the pallets 7. Due to the structural and functional design of the connecting elements 39 on their first and second ends 41, 43 and the way, in which these ends are coupled to the link pins 37 of the conveyor chain 5, it is possible to compensate a chord contraction on the connecting elements 39, which is caused by the deflection of the pallet belt 3.

According to an embodiment, each of the connecting elements 39 may on at least one of its ends 41, 43 be separably coupled to the associated link pin 37 in a direction extending transverse to the longitudinal direction 17 and transverse to the axis of the respective link pin 37, to which the respective end 41, 43 is coupled.

In other words, the connecting elements 39 may be realized in such a way that one of their ends can be separated from the associated extended link pin 37 by displacing this end 41, 43 in the direction extending transverse to the longitudinal direction 17 and transverse to the axis of the link pin 37. In other words, one of the ends 41, 43 of the connecting element 39 should be structurally realized in such a way that the connecting element 39 can be pivoted upward or downward from the longitudinal direction 17 and in the process separated from the associated link pin 37.

Due to the ability to be separated from the associated link pin 37, which is particularly realized by pivoting the connecting element 39, it is possible to separate the connecting element 39 from the coupling with the conveyor chain 5 at least on the respective end 41, 43 without having to strip the connecting element 39 from the associated link pin 35 in the axial direction. In this way, it is easily possible to assemble and remove the conveyor chain 5 described herein together with the connecting element 39 arranged thereon or to exchange individual connecting elements 39.

According to an embodiment, the connecting element 39 respectively has a passage opening 45, 47 on its front and rear ends 41, 43, wherein the respective link pin 37 extends through said passage opening in the state of the connecting element, in which it is coupled to the respectively associated link pin 37. In this case, the connecting element 39 has a lateral opening 49 on one of these passage openings 45 such that the associated link pin 37 can be moved out of the passage opening 45, 47 through the lateral opening 49 after the removal of a bush 53 and thereby separated from the coupling to the associated link pin 37.

In other words, passage openings 45, 47, through which the preferably extended link pins 37 can extend, should be respectively formed on the opposite ends 41, 43 of the connecting element 39. These passage openings 45, 47 may be dimensioned in such a way that a partially form-fitting connection with the cylindrical extended link pin 37 is produced, for example, in the front passage opening 45. Accordingly, the front passage opening 45 may be at least sectionally round and approximately have the same diameter as the extended link pin 37. The rear passage opening 47 in the connecting element 39 preferably can be realized in an elongate manner, for example, rectangular or quasi-rectangular. In this case, a length of this rear passage opening 47 in the longitudinal direction 17 may correspond to the distance d, by which the connecting element 39 should be displaceable relative to the associated link pin 35. A height of this rear passage opening 47 may approximately correspond to the diameter of the associated link pin 35.

In this case, at least one of the two passage openings 45, 47 may not be annularly closed, but rather open on one side. In other words, one end 41, 43 of the connecting element 39 may be realized with a passage opening 45 in the form of a laterally open and largely round eye. This passage opening 45 may be opened, for example, in a U-shaped or Q-shaped manner by the lateral opening 49.

The lateral opening 49 on the passage opening 45 makes it possible to realize the above-described ability to separate the connecting element 39 by means of a pivoting motion of the connecting element 39. A connecting element 39 can be installed, for example, by axially pushing its rear end 43 on the associated link pin 37 and subsequently coupling the front end 41 to the other associated link pin 37 by pivoting the connecting element 39 downward such that the associated link pin 37 reaches the passage opening 45 through the lateral opening 49 in order to produce the desired coupling between the chain formed by the chain links 47 and the connecting element 39.

According to an embodiment, adjacent connecting elements 39 may overlap one another in the longitudinal direction 17 and the rear end 43 of a front connecting element 39 and the front end 41 of a rear connecting element 39 may be respectively coupled to a common link pin 37.

In other words, the connecting elements 39 of the conveyor chain 5 described herein may overlap in the longitudinal direction 17 similar to the link plates 29 of the chain links 27 and adjacent connecting elements 39 may be respectively coupled to a common link pin 37 on one of their ends 41, 43.

In this case, all connecting elements 39 of the conveyor chain 5 preferably can be designed identically, for example, have the same geometry. The chain formed by the connecting elements 39 therefore can have a simple design and only one type of connecting elements 39 has to be produced, stored and ultimately installed. Two types of connecting elements 39 (right/left), which are realized mirror-symmetrically, may be required for the two mutually parallel and opposite conveyor chains 5 of a pallet belt 3.

For example, the connecting elements 39 may be realized in the form of elbowed links such that, for example, all rear ends 43 of the connecting elements 39 are on the associated link pins 37 arranged closer to the chain links 47 than the front ends 41 of adjacent connecting element 39 arranged on the same link pin 37.

In such a configuration, the rear ends 43 of the connecting elements 39 can be axially pushed over an associated link pin 37 with the annularly closed passage opening 47 in order to assemble the conveyor chain 5. After all connecting elements 39 were thusly attached to the associated link pins 37, the coupling pins [sic connecting elements] 39 can be pivoted in order to engage into an adj acent extended link pin 37 with their front end 41. In this way, the connecting elements 39 can be effectively installed on the conveyor chain 5 so as to form a chain extending parallel to the chain links 27 although they overlap one another in the longitudinal direction.

According to an embodiment, the rear end 43 of the connecting element 39 may be respectively held on the associated link pin 35, 37 by means of a sliding element 51. In this case, the sliding element 51 may be mounted between opposing surfaces of the connecting element 39 of the one hand and the link pin 37 on the other hand.

In other words, the connecting elements 39 may be respectively coupled to the associated link pin 37 by means of the sliding element 51 on their rear end 43. In this case, the sliding element 51 can ensure a desired frictional connection in certain directions or a definite form-fitting connection in certain directions between the extended link pin 37 on the one hand and, for example, inner surfaces in the region of the passage opening 47 in the connecting element 39 on the other hand.

According to a concrete embodiment, the connecting element 39 may have a slot-like passage opening 47 with mutually parallel inner surfaces on its rear end 43. In this case, the sliding element 51 may have an outer contour with mutually parallel outer surfaces that border on the inner surfaces of the passage opening 47.

In other words, the sliding element 51 may, for example, have a rectangular or quasi-rectangular outer contour and the passage opening 47 in the rear end 43 of the connecting element 39 may likewise be realized rectangular or quasi-rectangular. In this case, a height of the sliding element 51 may correspond to a height of the passage opening 47. However, a length of the sliding element 51 should be shorter than a length of the passage opening 47. For example, the length of the sliding element 51 may amount to less than 50% or less than 30% of the length of the passage opening. Such a design enables the sliding element 51 to move linearly within the passage opening 47, for example, by the above-described distance d. In other words, the sliding element 51 may be realized in the form of a square component and form a linear guide together with the slot-like passage opening 47 in the connecting element 39.

In other words, the design of the sliding element 51 and the passage opening 47 makes it possible to linearly guide the connecting element 39 in order to compensate the chord contraction occurring during a deflection of the conveyor chain.

A contact surface, on which the sliding element 51 contacts the inner surface of the passage opening 47 on the connecting element 39, can be enlarged due to the design of the sliding element 51 and the passage opening 47 with mutually parallel surfaces. This makes it possible to reduce a surface pressure when the connecting element 39 is connected to the associated link pin 37. For example, wear on the conveyor chain 5 can thereby be reduced.

The front end 41 of the connecting element 39 is held on the associated link pin 35 by means of a bush 53 in the above-described manner.

In this context, the bush 53 may be mounted between an outer surface of the associated link pin 37 and an inner surface in the region of the passage opening 45 of the connecting element 39. The bush 53 may be annularly closed, particularly realized circular or cylindrical. During the assembly of the conveyor chain 5, the bush 53 can be pushed on the extended link pin 37 in an axial direction, for example, after the front end 41 of the connecting element 39 was pivoted over the associated link pin 37 with its lateral opening 49. A form-fitting connection can thereby be produced between the extended link pin 37 and the connecting element 39 in the region of its laterally open front passage opening 45.

According to an embodiment, the sliding element 51 and/or the bush 53 may be at least partially made of a polymeric material, for example, consist of polymeric material or, for example, be coated with a polymeric material. It is preferred to use polymeric materials that not only have an adequate strength, but also provide sufficient sliding properties between the sliding element 51 or the bush 53 on the one hand and the associated link pins 35 and connecting elements 39 to be coupled, which pivot relative to these components, on the other hand. For example, thermosetting polymers or thermoplastic polymers such as PA, PMMA, POM, GFK, CFK, PVC, PTFE and the like may be used as polymeric materials.

According to an embodiment, the connecting element 39 may be made of metal. In this way, the connecting elements 39 can be provided with a sufficient mechanical stability for acting as an intermediate link between the pallets 7 attached thereto and the interconnected chain links 27 of the conveyor chain 5 and, for example, for absorbing tensile forces of the conveyor chain if a chain link breaks. For example, high-strength metals such as steel may be used for this purpose.

According to an embodiment, a guide roller 55 may be respectively arranged on at least a few of the link pins 35, 37, wherein the guide roller 55 should be mounted so as to be rotatable relative to the respective link pin 35, 37 about its longitudinal center axis. Similar to conventional conveyor chains, such guide rollers 55 can serve for supporting and guiding the conveyor chain 5 on not-shown guide rails during a motion along the longitudinal direction 17, as well as for reducing the friction between the conveyor chain 5 and a supporting and/or guiding structure. For example, the guide rollers 55 may be realized with metal or with a polymeric material. The guide rollers 55 may be mounted on the respective link pins 35, 37 in a friction-reducing manner, for example, by means of a sliding bearing. The guide rollers 55 may be arranged between the chain links and the connecting elements 39.

In addition to the components described in detail above, other component may also be provided on the conveyor chain 5. For example, one or more sliding disks or spacer disks may be provided axially along the extended link pins 37. In addition, a fastening element 63 such as the self-tapping fixing screw 59 shown may be respectively provided on an axial end of the extended link pins 37, wherein said fixing screw can be screwed on the respective extended link pin 37 in order to thereby secure the components coupled to this link pin 37, for example, particularly the connecting elements 39, the sliding elements 51 and the bushes 53, from axially sliding off the link pin 37.

The assembly of the conveyor chain 5 can be realized, for example, in that connecting elements 39 are respectively arranged and coupled to their link pins 37 on a chain or link chain, which was conventionally preassembled of chain links 27 and link pins 35, 37. An exemplary coupling process for an embodiment of the method for assembling a conveyor chain 5 is described below with reference to FIGS. 3 and 4a to 4c.

In order to install the connecting elements 39 of the conveyor chain 5, the chain composed of chain links 27 and link pins 35, 37 comprises extended link pins 37 at every third articulation point. Guide rollers 55 are initially arranged on these link pins 37, for example, by being axially pushed thereon. The sliding elements 51 are then axially pushed on the extended link pins 37. The connecting elements 39 are subsequently installed. For this purpose, the connecting elements 39 respectively can be axially pushed on the link pins 37 with their rear end 43 and then pivoted in the pivoting direction 61 in order to couple the respective front ends 41 to adjacent extended link pins 37. Alternatively, all connecting element 39 with the exception of the last connecting element 39 can be axially pushed on adjacent extended link pins 37 with their two ends in succession. However, at least the last connecting element 39 cannot be axially pushed on in this way, but rather has to be pivoted tangentially with its front end 41 in order to be coupled to the associated link pin 37. Subsequently, the connecting elements 39 can be secured on the extended link pins 37, for example, by axially inserting and axially fixing the bushes 53 with the aid of the fixing screws 59. If so required, sliding disks and/or spacer disks 57 may be provided between the individual elements, particularly for spacing apart flanks of the connecting elements 39 from one another.

The conveyor chain 5 described herein or the conveyor chain 5 assembled in accordance with the method described herein can also be advantageously used for realizing a pallet belt 3 for a moving walkway 1.

For this purpose, two conveyor chains 5 are initially assembled in accordance with the method described herein and subsequently arranged parallel to one another. Multiple pallets 7 are then installed on the two conveyor chains 5. In this case, the pallets 7 are arranged behind one another in the longitudinal direction 17 of the conveyor chains 5 and each of the pallets 7 is fastened on one of the connecting elements 39 of the first conveyor chain 5 with a first lateral end and on one of the connecting elements 39 of the second conveyor chain 5 with an opposite second lateral end.

In other words, the pallet belt 3 may be formed by two conveyor chains 5, which are supplemented with connecting elements 39, and the pallets 7 screwed to the connecting elements 39. In a shop assembly, for example, this can be realized with an assembly device, the positioning portion of which is formed by two chain guides that can be adapted to different pallet widths. This can be very easily realized, for example, by means of a rotatably mounted shaft with chain wheels. The assembly device may also be fully automated with the aid of automatic placement machines, for example, in the form of robots.

In conclusion, it should be noted that the terms such as "having," "comprising," etc. do not preclude any other elements or steps and that terms such as "a" or "an" do not preclude a plurality. It should furthermore be noted that characteristics or steps, which were described above with reference to one of the exemplary embodiments, can also be used in combination with other characteristics or steps of other above-described exemplary embodiments. The reference symbols in the claims should not be interpreted in a restrictive sense.

LIST OF REFERENCE SYMBOLS

1 Moving walkway
3 Pallet belt
5 Conveyor chain
7 Pallet
9 Deflection chain wheel
11 Ramp
13 Handrail
15 Floor
17 Longitudinal direction
19 Deflecting region
21 Deflection device
23 Toothed wheel
25 Tooth
27 Chain link
29 Link plate
31 Sleeve
33 Joint region
35 Link pin
37 Extended link pin
39 Connecting element
41 Front end of connecting element
43 Rear end of connecting element
45 Front passage opening
47 Rear passage opening
49 Lateral opening
51 Sliding element
53 Bush
55 Guide roller
57 Sliding/spacer disk
59 Fixing screw
61 Pivoting direction
63 Fastening element
65 Fastening region
67 Fastening means
T1 Chain pitch
T2 Connecting element pitch
h Structural height

The invention claimed is:

1. A conveyor chain for a pallet belt of a moving walkway, the conveyor chain comprising:
    multiple elongate chain links that are arranged behind one another at a chain pitch in a longitudinal direction of the conveyor chain, wherein chain links lying adjacent to one another in the longitudinal direction are respectively subjected to a tensile load in a joint region by a link pin and are coupled to one another so as to be pivotable about a longitudinal center axis of the link pin transverse to the longitudinal direction,
    multiple elongate connecting elements, which are arranged behind one another in the longitudinal direction, wherein two connecting elements lying adjacent to one another in the longitudinal direction respectively can be coupled to one another by one of the link pins that couple the chain links to one another, and wherein each of the connecting elements can be pivoted about the longitudinal center axis of the link pin transverse to the longitudinal direction;
    wherein each of the connecting elements comprises a front end that is coupled to an associated first link pin and a rear end that is coupled to an associated second link pin,
    wherein a connecting element pitch between the first and second link pin comprises an integer multiple of the chain pitch, and wherein each of the connecting elements has a fastening region for connecting a pallet.

2. The conveyor chain according to claim 1, wherein:
    the front end of the connecting element is coupled to the associated first link pin so as to be pivotable and coaxially positioned; and
    wherein the rear end of the connecting element is coupled to the associated second link pin so as to be pivotable and linearly guided in the longitudinal direction.

3. The conveyor chain according to claim 2, wherein the rear end of the connecting element is linearly guided so as to be displaceable over a predefined distance.

4. The conveyor chain according claim 1, wherein each connecting element is on at least one of its ends separably coupled to the associated link pin in a direction extending transverse to the longitudinal direction and transverse to the longitudinal center axis of the associated link pin, to which the respective end is coupled.

5. The conveyor chain according claim 1, wherein adjacent connecting elements overlap one another in the longitudinal direction and the rear end of a front connecting element and the front end of a rear connecting element are respectively coupled to a common link pin.

6. The conveyor chain according claim 1, wherein the rear end of the connecting elements is respectively held on the associated link pin using a sliding element, and wherein the sliding element is mounted between opposing surfaces of the connecting element on the one hand and the link pin on the other hand.

7. The conveyor chain according to claim 6, wherein the connecting element has a slot-like passage opening with mutually parallel inner surfaces on its rear end, and wherein the sliding element has an outer contour with mutually parallel outer surfaces that border on the inner surfaces of the passage opening.

8. The conveyor chain according to claim 1, wherein the connecting element respectively has a passage opening on its front end and on its rear end, wherein the respective link pin extends through said passage opening in a connected state, in which the connecting element is coupled to the respectively associated link pin, and wherein the connecting element has a lateral opening on one of these passage openings such that the link pin can be moved out of the passage opening through the lateral opening and thereby separated from the coupling to the link pin after the removal of a bushing.

9. The conveyor chain according to claim 8, wherein the sliding element and/or the bushing are at least partially made of a polymeric material.

10. The conveyor chain according to claim 1, wherein the connecting element is at least partially made of metal.

11. The conveyor chain according to claim 1, wherein a guide roller furthermore is mounted on at least some of the link pins so as to be rotatable relative to the link pin.

12. A pallet belt for a moving walkway, the pallet belt comprising:
    a first and a second conveyor chain, each configured as the conveyor chain of claim 1, wherein the two conveyor chains are arranged parallel to one another; and
    multiple pallets that are arranged behind one another in a longitudinal direction of the conveyor chains;
    wherein each of the pallets is fastened on a fastening region of the connecting elements of the first conveyor chain with a first lateral end and fastened on a fastening region of the connecting elements of the second conveyor chain with an opposite second lateral end.

13. The pallet belt according to claim 11, wherein each of the pallets is longer than the chain links by at least an integral multiple.

14. A moving walkway, comprising:
    a pallet belt according to claim 12; and
    two deflection devices with respective deflection chain wheels for deflecting the pallet belt in the deflecting regions on opposite ends of the moving walkway.

15. The moving walkway according to claim 14, wherein the deflection chain wheels have a diameter between 20 and 40 cm and comprise at least 17 teeth.

16. The conveyor chain according to claim 1, wherein the pallet is removably connected to the fastening region of the connecting elements.

* * * * *